United States Patent Office 3,447,780
Patented June 3, 1969

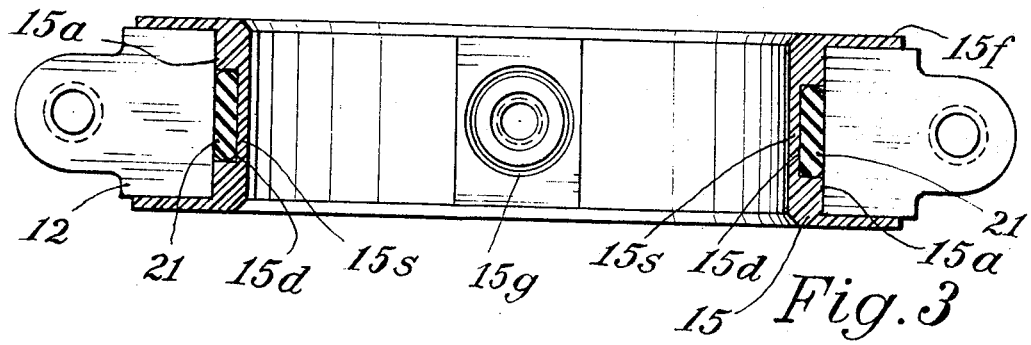
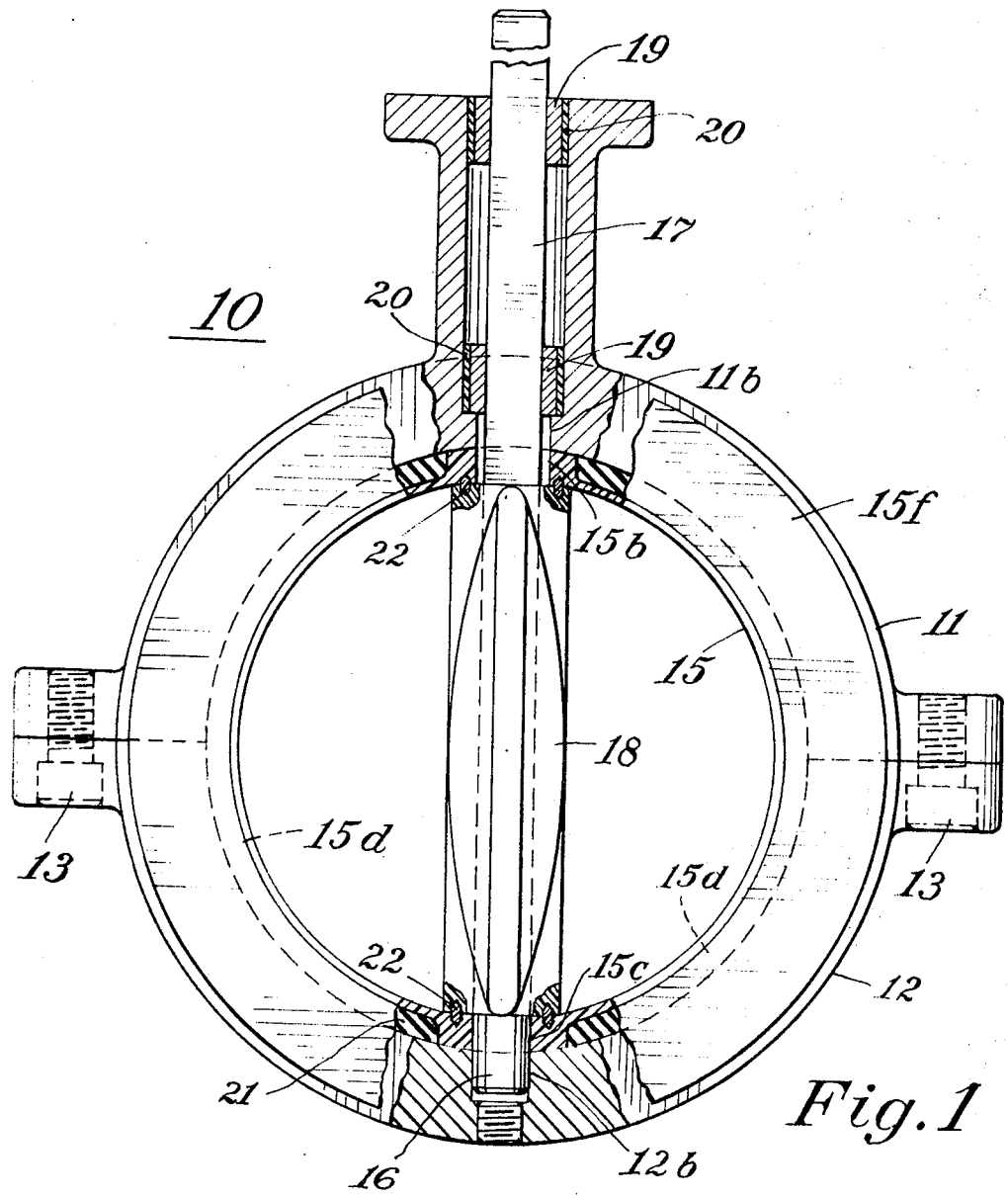

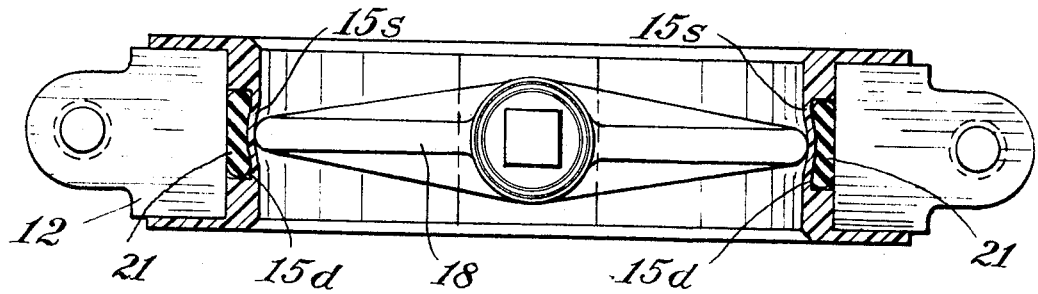
Fig. 4
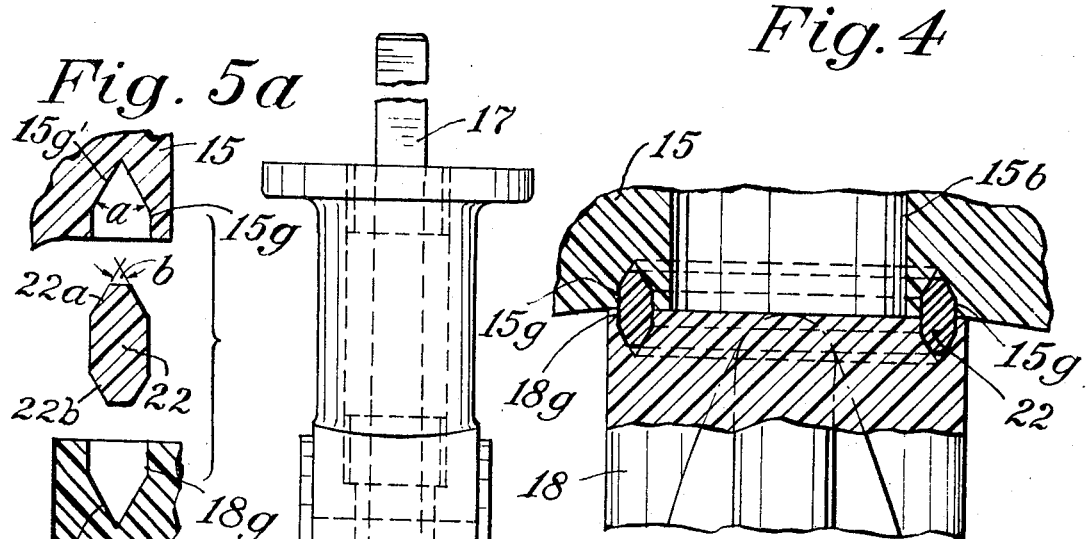
Fig. 5a
Fig. 5
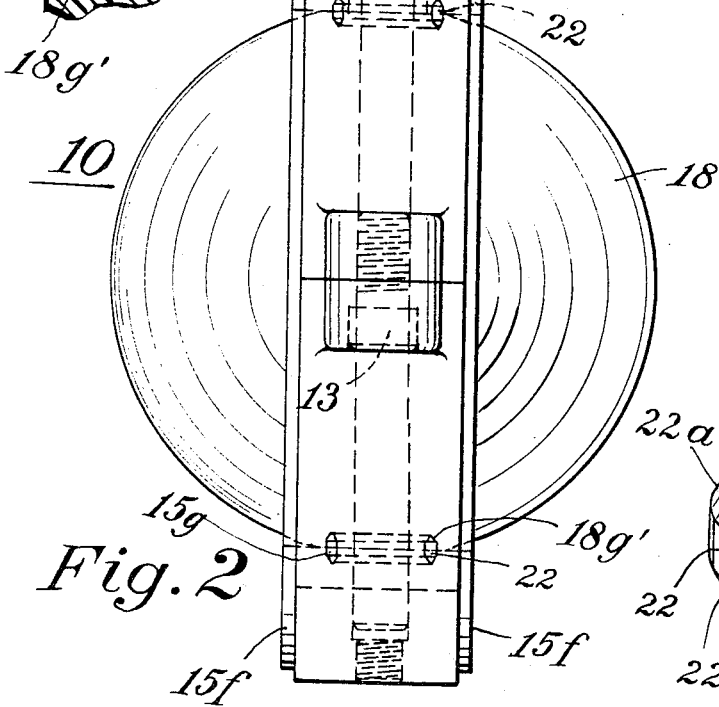
Fig. 2
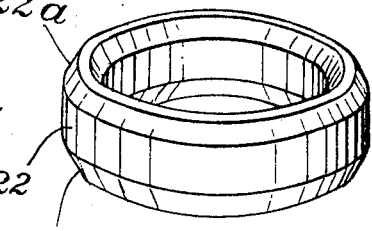
Fig. 6

3,447,780
PLASTIC RESIN LINED BUTTERFLY VALVE WITH IMPROVED SEALING ARRANGEMENTS
Charles M. Hobson, Jr., Wenonah, N.J., assignor to Garlock Inc., Palmyra, N.Y., a corporation of New York
Filed June 22, 1967, Ser. No. 648,040
Int. Cl. F16k 1/226, 25/00
U.S. Cl. 251—306      8 Claims

ABSTRACT OF THE DISCLOSURE

A butterfly valve device having a replaceable substantially rigid fluorocarbon resin valve liner having a thin-walled resiliently backed sealing surface for cooperation with a pivoted fluorobcarbon resin encapsulated butterfly disc and making wedge-shaped grooves in the liner and in the opposite ends of the disc for receiving corresponding wedge-shaped sealing rings to provide an improved sealing arrangement.

Field of invention

The present invention is directed to butterfly valves having a replaceable resilient backed substantially rigid plastic resin valve liner and disc unit with improved sealing arrangement to prevent leakage of fluid through the valve when the latter is in closed position.

Prior art

Fluid handling equipment for the process industry is under constant demand for both increased corrosion resistance and higher pressure tolerances. One method of meeting this demand has been to coat or line structure of ordinary materials with layers having superior corrosion resistance. The success of this practice is evidenced by the existence of large quantities of heavy lined pipes, vessels, fittings, and valves in use today. Of the more resistant lining materials, fluorocarbon resins are quite widely used. Fluorocarbon coatings are especially desirable for the protection of the more intricate and relatively expensive fluid regulating valves. Some types of valves have been successfully coated or lined with fluorocarbon resins; however, certain leakage problems have been encountered with the butterfly type valves, particularly at high pressure conditions.

One arrangement of the prior art is disclosed in Snell, Jr., Patent 3,241,806 in which a butterfly disc valve was provided with a plastic layer on a resilient seating surface. In this patent a thin layer of plastic such as Teflon having a thickness ranging between 0.020 to 0.060 inch was bonded to a rubber-like material backing.

The present invention is an improvement on the replaceable substantially rigid fluorocarbon resin valve unit for use in butterfly valves disclosed in application Ser. No. 438,181 of Frederick H. Buckley et al. of Mar. 9, 1965, now Patent No. 3,376,014, issued Apr. 2, 1968, and assigned to applicant's assignee, which was an improvement over Snell.

The present invention provides a replaceable substantially rigid plastic resin valve unit for use in butterfly valves wherein the plastic liner, although substantially rigid, includes a thin-walled section providing a sealing surface which is resiliently backed and cooperates with the periphery of the valve disc to provide a leak proof seal when the valve disc is turned to closed position in the valve liner. The valve liner and the opposite ends of the valve disc are provided with mating pairs of sealing grooves which are adapted to receive sealing rings of improved construction to prevent seepage around the aligned openings in the liner through which the pivotal supports for the disc extend.

Summary of invention

The present invention is directed to a butterfly valve of the type including a valve body having a cylindrical bore with diametrically opposed openings for receiving pivot means. The invention relates to the improvement of means for handling corrosive fluids and having high corrosive resistance and high pressure leakproof tolerance comprising a substantially rigid plastic resin, preferably fluorocarbon, lining for the cylindrical bore of the valve body defining a flow passage through which corrosive fluids may pass. The lining is provided with a tubular portion, the outer surface of which is adapted to seat in the cylindrical bore and having end flanges for extending radially over the ends of the valve body. The tubular portion of the lining is provided with diametrically opposed openings adapted for alignment with the openings in the valve body for receiving pivot means. The outer surface of the tubular portion of the lining includes channel portions extending circumferentially therearound between the opposed openings therein to provide a wall section of reduced thickness in a tubular portion of the lining intermediate the ends thereof. A substantially uniformly resilient backing means is positioned in the channel portions to provide resilient backing for the wall section of reduced thickness in the tubular portion of the lining. A substantially rigid plastic resin, preferably fluorocarbon, encapsulated butterfly disc is positioned within a substantially rigid plastic resin lining on the diameter passing through the aligned openings. Each of the pivotal ends of the butterfly disc is provided with grooves extending therearound, each of the opposed openings of the liner having grooves extending therearound and aligned with mating ones of the grooves in the pivotal ends of the butterfly disc. Sealing ring means, preferably of fluorocarbon resin, is positioned in each mating pair of grooves, the sliding contact between the pair of sealing ring means and their mating grooves sealing the fluid from seepage around the aligned openings. The pivotal surfaces of contact between the lining and the disc effect a pressure sealing of the passage of the lining on the perimeter of the disc when the disc is pivoted to and maintained at a right angle to the axis of the passage to effect continuous pressure contact with the deformed internal surface of the lining at the wall section of reduced thickness. The radii of the disc are slightly greater in dimension than the corresponding internal radii of the plane of contact of the passage through the lining at the wall section of reduced thickness when undeformed.

In a preferred form of the invention, the sealing rings include wedge-shaped portions which are adapted to be received in the mating grooves which have a corresponding wedge shape, the included angle of the wedge on the sealing rings being greater than the included angle of the wedge-shaped groove in which it is received.

For a more detailed explanation of the invention and for further objects and advantages thereof, reference is to be had to the following description taken in conjunction with the accompanying drawings.

Brief description of drawings

FIG. 1 is an elevational view of a butterfly valve embodying the present invention shown in open position and with portions thereof broken away;

FIG. 2 is a side elevational view of the butterfly valve shown in FIG. 1;

FIG. 3 is a horizontal sectional view of the lower half of the valve in FIG. 1, with the valve disc removed for clarity;

FIG. 4 is a horizontal sectional view similar to FIG. 3 and showing the valve disc rotated to closed position;

FIG. 5 is a partial view of FIG. 1 on enlarged scale with portions broken away to show the sealing ring arrangement at the upper end of the valve disc;

FIG. 5a is a partial exploded view of the sealing ring and mating groove shown in FIG. 5; and FIG. 6 is a perspective view of the sealing ring shown in FIGS. 1, 2, 5, and 5a.

*Description of preferred embodiment of the invention*

Referring to the drawings, there is illustrated a butterfly valve 10 embodying the preferred form of the invention. The valve housing may be of conventional type and comprise a valve body of two parts 11 and 12 held together by screws 13 and providing a cylindrical bore. As may be seen in FIG. 1, the valve body is split horizontally across its diameter. The bore configuration will, of course, conform to that of the particular type of conduit on which the valve unit 10 is assembled.

Within the cylindrical bore of the valve body, there is provided a substantially rigid fluorocarbon resin lining or liner 15. The lining 15 is provided with a tubular portion having an outer surface 15a which is adapted to seat in the cylindrical bore and having end flanges 15f for extending radially over the ends of the valve body 11, 12. The tubular portion of the lining 15 is provided with diametrically opposed openings 15b, 15c adapted for alignment with the openings 11b and 12b in the valve body for receiving pivot means 16 and 17 which support the substantially rigid fluorocarbon resin encapsulated disc 18. The fluorocarbon resin encapsulated disc 18 may be in any suitable metallic material having the required strength meeting the operating demand; examples of such materials include carbon and stainless steel, Monel, Inconel, Hastelloy and the like. The fluorocarbon resin is applied to the disc by encapsulation to obtain practical thickness and meet the required dimension factor. In the arrangement illustrated in FIG. 1 the shaft 17 extending through the encapsulated disc 18 is of square cross section with the lower pivot 16 being cylindrical. The upper portion of the square shaft 17 is adapted to extend through a pair of spaced square hole bushings 19, the outer surfaces of which are cylindrical and are adapted to be positioned in a pair of low friction bushings 20.

The outer surface of the tubular portion of the lining 15 is provided with channel portions 15d, FIGS. 1, 3, and 4, extending circumferentially therearound between the opposed openings 15b and 15c to provide a wall section 15s of reduced thickness in the tubular portion of the liner 15 intermediate the ends thereof. A substantailly uniformly resilient backing means, such for example as an elastomeric strip 21 is inserted in each of the channel portions 15d. The elastomeric strips 21 are adapted to substantially fill the space between the outer surface of the wall section 15s of reduced thickness in the tubular portion of the lining 15 and the opposed surface of the bore of the valve body members 11 and 12. The backing strips 21 are not bonded to either the liner 15 or the valve body members 11 and 12. The strips 21 are preferably rounded on the edges to provide a space for expansion in the channels 15d when the strips are under compression as shown in FIG. 4.

Some minor adjustability of the fit between the disc member 18 and the valve liner 15 may be attained by adjusting the tension on the fastening screws 13. Further allowance for such an adjustment can be provided by machining the matching faces of the valve housing body members 11 and 12 to slightly less than 180°.

As may be seen in FIG. 4, the diameter of the disc 18 is slightly greater than the diameter of the passage through the tubular portion of the lining 15. Thus when the disc 18 is rotated from the position shown in FIG. 1 through 90° to the position shown in FIG. 4 where it is perpendicular to the axis of the flow passage, the peripheral edge of the disc 18 will deform the internal surface of the lining 15 at the wall section 15s of reduced thickness, thereby causing the resilient backing strips 21 to be compressed.

By providing the lining 15 with this construction, the cross-section of the lining may be maintained relatively thick adjacent both sides of the sealing surface to enhance the rigidity of the lining 15 but at the same time the sealing surface of the lining 15 is provided with a wall section 15s of reduced thickness to enhance the resiliency of the sealing area with respect to the periphery of the fluorocarbon resin encapsulated disc 18. It is extremely important in butterfly valves to make the sealing surface of the valve liner as resilient as possible, while maintaining adequate strength for service conditions, so as to minimize the force required to pivot the sealing disc 18 into and out of sealing relationship with respect to the valve liner. Where the sealing surface of the valve liner is not sufficiently resilient, the valve disc cannot be moved into fully closed position, FIG. 4, and as a result the valve will leak. When the disc 18 is moved to open position as illustrated in FIGS. 1 and 2, the wall sections 15s of reduced thickness in the tubular portion of the lining 15 and the resilient backing strips 21 will assume the undeformed positions illustrated in FIG. 3.

In butterfly valves it is not only necessary to prevent leakage around the periphery of the disc 18, but it is also necessary to seal the fluid stream from seepage around the valve stems. This is accomplished by providing each of the pivotal ends of the butterfly disc 18 with grooves 18g extending therearound as shown in FIG. 5. The liner 15 is also provided with grooves 15g extending around the opposed liner openings 15b and 15c, as best shown in FIGS. 5 and 5a. In FIG. 5 it will be seen that the groove 15g of the liner 15 mates with the groove 18g in the pivotal end of the butterfly disc 18 and this mating pair of grooves is adapted to receive a sealing ring 22. Referring to FIG. 5a, it will be seen that the groove 15g includes a wedge-shaped portion 15g' and that the mating surface 22a of the sealing ring 22 received therein is shaped as a wedge. In order to effect a tight sealing engagement over a wide range of pressrues between the groove 15g and the ring 22, the included angle b of the wedge 22a on the ring 22 is greater than the included angle a of the wedge-shaped groove 15g'. For example, in one embodiment of the invention, the included angle b of the wedge portion 22a was 70° while the included angle a of the wedge-shaped portion of the groove 15g' was 60°. The horizontal dimension of the open end of the groove 15g was the same as the horizontal dimension of the cross-section of the midportion of the sealing ring 22. Similarly, the groove 18g in the adjacent pivotal end of the disc 18 is provided with a wedge-shaped portion 18g' which is adapted to receive the other wedge portion 22b of the sealing ring 22. The included angle of the wedge 22b on the ring 22 is greater than the included angle of the wedge-shaped groove 18g'. A complete sealing ring 22 with its wedge portions 22a and 22b is shown in perspective in FIG. 6.

In a preferred form of the invention, the sealing rings 22 are fluorocarbon resin sealing rings. The sealing of the fluid stream from seepage around the valve stems is accomplished by the resin-to-resin sliding contact between the sealing rings 22 and the mating grooves 18g and 15g in which they are received. This seal effected by the rings 22 is maintained continuously for all positions of the fluorocarbon resin encapsulated disc 18 whereas the seal between the perimeter of the encapsulated disc 18 and the thin-wall section 15s of the fluorocarbon resin liner 15 is only maintained when the disc 18 is in the closed position, as illustrated in FIG. 4. With a valve lining 15 and wedge type sealing rings 22 of the type disclosed herein, butterfly valves have been able to operate satisfactorily at pressures up to 500 p.s.i. at 400° F.

The resilient backing member 21 may be of any suitable material having sufficient compressibility and resilience to achieve an effective seal between the thin-wall section 15s of the fluorocarbon resin liner 15 and the periphery of the fluorocarbon encapsulated disc 18. Representative cured elastomer materials having the necessary resiliency and compression characteristics to assure a leakproof seal include natural rubber, silicone rubber, butyl rubber, neoprene, "Viton" fluoroelastomers, "Hypalon" synthetic rubber, "Nordel" hydrocarbon rubber, buna-N, buna-S, and the like. Additionally, substantially uniformally resilient backing-ring means may include fabricated ring materials composed or constructed of metallic and/or nonmetallic materials which can be made to function in a manner similar to the elastomeric backing-ring heretofore described. Such backing-ring means may include spring structures and pneumatic structures. The elastomeric backing member 21, for example, may be silicone elastomer stock. In general, the particular elastomer utilized will be cured and have a type A durometer of approximately 50 to 85; the temperature of operation as well as durometer property will determine which elastomer is selected.

Representative substantially rigid fluorocarbon resins which may be utilized as the valve liner and disc molded cover include polytetrafluoroethylene, hexafluoroethylene propylene, polychlorotrifluoroethylene, and vinylidene fluoride resins and copolymers and the like. In addition, other polymeric materials may be utilized such as polyethylene, polypropylene and vinyl polymetrs. The sealing rings 22 may be made of any of the resins mentioned in this paragraph or they may be altered with any suitable inorganic fillers such as, glass, asbestos, calcium fluoride, molybdenum disulfide.

The lining 15 may have a smooth inner surface on the thin wall section 15s as illustrated in FIGS. 3 and 4. By way of modification the inner surface of the thin wall section 15s may be provided with a shallow groove which is adapted to receive the perimeter of the disc 18 when in closed position. The depth of the groove need not be great. For example, a depth of about 0.012 inch is adequate.

What is claimed is:

1. In a butterfly valve of the type including a valve body having a cylindrical bore with diametrically opposed openings for receiving pivot means, the improvement of means for handling corrosive fluids and having high corrosive resistance and high pressure leakproof tolerance comprising:

a substantially rigid plastic resin lining for the cylindrical bore of the valve body defining a flow passage through which corrosive fluids may pass, said lining having a tubular portion the outer surface of which is adapted to seat in the cylindrical bore and having end flanges for extending radially over the ends of the valve body, said tubular portion of said lining having diametrically opposed openings adapted for alignment with the openings in the valve body for receiving pivot means, said outer surface of said tubular portion of said lining having channel portions extending circumferentially therearound between said opposed openings therein to provide a wall section of reduced thickness in said tubular portion of said lining intermediate the ends thereof, substantially uniformly resilient backing means positioned in said channel portions to provide resilient backing for said wall section of reduced thickness in said tubular portion of said lining, a substantially rigid plastic resin encapsulated butterfly disc within said substantially rigid plastic resin lining on the diameter passing through said aligned openings, each of said pivotal ends of said butterfly disc having grooves extending therearound, each of said opposed openings of said lining having grooves extending therearound and aligned with mating ones of said grooves in said pivotal ends of said butterfly disc, and sealing ring means positioned in each mating pair of grooves, the sliding contact between the pair of said sealing ring means and their mating grooves sealing the fluid from seepage around said aligned openings, the pivotal surfaces of contact between said lining and said disc effecting a pressure sealing of the passage of said lining when the perimeter of said disc is pivoted to and maintained at a right angle to the axis of said passage to effect continuous pressure contact with the deformed internal surface of said lining at said wall section of reduced thickness, the radii of said disc being slightly greater in dimension than the corresponding internal radii of the plane of contact of said passage through said lining at said wall section of reduced thickness when undeformed.

2. In a butterfly valve according to claim 1 wherein at least one of said grooves in each mating pair is wedge-shaped and the mating surface of said sealing ring means received therein is shaped as a wedge, the included angle of the wedge on said ring means being greater than the included angle of said wedge-shaped groove.

3. In a butterfly valve according to claim 1 wherein both of said grooves in each mating pair are wedge-shaped and the mating surfaces of said sealing ring means received therein are shaped as a wedge, the included angle of the wedge surfaces on said ring means being greater than the included angle of said wedge-shaped grooves.

4. In a butterfly valve according to claim 1 wherein said substantially rigid plastic resin lining and said sealing ring means are constructed from a fluorocarbon resin and said butterfly disc is encapsulated in a fluorocarbon resin.

5. In a butterfly valve of the type including a valve body having a cylindrical bore with diametrically opposed openings for receiving pivot means, the improvement of means for handling corrosive fluids and having high corrosive resistance and high pressure leakproof tolerance comprising:

a substantially rigid plastic resin lining for the cylindrical bore of the valve body defining a flow passage through which corrosive fluids may pass, said lining having a tubular portion the outer surface of which is adapted to seat in the cylindrical bore and having end flanges for extending radially over the ends of the valve body, said tubular portion of said lining having diametrically opposed openings adapted for alignment with the openings in the valve body for receiving pivot means, substantially uniformly resilient backing means for said tubular portion of said lining, a substantially rigid plastic resin encapsulated butterfly disc within said substantially rigid plastic resin lining on the diameter passing through said aligned openings, each of said pivotal ends of said butterfly disc having grooves extending therearound, each of said opposed openings of said lining having grooves extending therearound and aligned with mating ones of said grooves in said pivotal ends of said butterfly disc, and sealing ring means positioned in each mating pair of grooves, at least one of said grooves in each mating pair being wedge-shaped and the mating surfaces of said sealing ring means received therein being shaped as a wedge, the included angle of the wedge on said ring means being greater than the included angle of said wedge-shaped groove, the sliding contact between the pair of said sealing ring means and their mating grooves sealing the fluid from seepage around said aligned openings, the pivotal surfaces of contact between said lining and said disc effecting a pressure sealing of the passage of said lining when the perimeter of said disc is pivoted to and maintained at a right angle to the axis of said passage to effect continuous pressure contact with the deformed internal surface of said lining, the radii of said disc being slightly greater in dimension than the corresponding internal radii of the plane of contact of said passage through said lining when undeformed.

6. In a butterfly valve according to claim 5 wherein both of said grooves in each mating pair are wedge-shaped and the mating surfaces of said sealing ring means received therein are shaped as a wedge, the included angle of each of the wedge surfaces on said ring means being greater than the included angle of each of the corresponding mating wedge-shaped grooves.

7. A butterfly valve comprising a valve body having a cylindrical bore,
a lining including a resilient portion in said bore defining a flow passage through which fluid material may pass, said lining having diametrically opposed openings therethrough aligned with similar openings in said valve body for receiving pivot means,
a butterfly valve disc carried by the pivot means for engaging said lining to close said flow passage,
said disc having pivotal ends adjacent said opposed openings in said lining,
each of said pivotal ends of said butterfly disc having grooves extending therearound,
each of said opposed openings of said lining having grooves extending therearound and aligned with mating ones of said grooves in said pivotal ends of said butterfly disc, and
sealing ring means positioned in each mating pair of grooves for sealing the space around said pivot means from the passage of the fluid material,
at least one of said grooves in each mating pair being wedge-shaped and the mating surface of said sealing ring means received therein being shaped as a wedge,
the included angle of the wedge on said sealing ring means being greater than the included angle of said wedge-shaped groove.

8. A butterfly valve according to claim 7 wherein said lining and said sealing ring means are constructed from fluorocarbon resin and both of said grooves in each mating pair are wedge-shaped and the mating surfaces of said sealing ring means received therein are shaped as a wedge,
the included angle of each of the wedge surfaces on said ring means being greater than the included angle of each of the corresponding mating wedge-shaped grooves.

References Cited
UNITED STATES PATENTS

| | | | |
|---|---|---|---|
| 2,987,072 | 6/1961 | Muller | 251—306 |
| 3,072,139 | 1/1963 | Mosites | 251—306 X |
| 3,173,650 | 3/1965 | Cotterman et al. | 251—306 |
| 3,186,682 | 6/1965 | Pierson | 251—306 |
| 3,241,806 | 3/1966 | Snell | 251—306 X |
| 3,314,642 | 4/1967 | Kautz et al. | 251—307 |
| 3,376,014 | 4/1968 | Buckley et al. | 251—306 |

M. CAREY NELSON, *Primary Examiner.*

ROBERT C. MILLER, *Assistant Examiner.*

U.S. Cl. X.R.

251—173